L. E. de WARU.

Manufacture of Boots and Shoes.

No. 8,182. Reissued April 16, 1878.

Witnesses:

Louis F. Brous?

No. P. Grant.

Inventor:

L. E. de Waru, by

John A. Wiedersheim

ATTORNEY.

N. PETERS, PHOTO-LITHOGRAPHER, WASHINGTON, D. C.

UNITED STATES PATENT OFFICE.

LAURENS EMMANUEL DE WARU, OF PHILADELPHIA, PENNSYLVANIA.

IMPROVEMENT IN MANUFACTURE OF BOOTS AND SHOES.

Specification forming part of Letters Patent No. 155,228, dated September 22, 1874; Reissue No. 8,182, dated April 16, 1878; application filed December 12, 1877.

*To all whom it may concern:*

Be it known that I, LAURENS EMMANUEL DE WARU, formerly of Baltimore, Maryland, at present of the city and county of Philadelphia, and State of Pennsylvania, have invented a new and useful Improvement in Closing Boot or Shoe Seams, which improvement is fully set forth in the following specification and accompanying drawings, in which similar letters of reference indicate corresponding parts in the several figures.

My invention relates to that class of boots or shoes in which the seams are strengthened by means of narrow strips of light leather or kid.

In forming such seams the method in use consists in sewing the edges of the parts together, the outside stay being afterward stitched, so as to protect and cover the first seam. This method is liable to several objections. The stitching by which the stay is fastened to the shoe, being on the surface, is subject to chafing, while the raw edges of the stay impair the looks of the shoe. The stay becomes loose and exposes the single seam, which, of itself, has but little strength, and it soon bursts.

Another method intended to obviate the last objection alluded to consists in turning under the edges of the stay before stitching it on the shoe-upper; but in this case an important waste of stock is caused, because to admit of the proper feeding of the work under the presser-foot of the sewing-machine, the edges of the stay must be doubled under, so as to touch, or nearly touch, each other. The stitches of the seams on the outside stay, being also unprotected, are liable to wear out.

The object of my invention is to form a seam protected by a stay the edges of which are turned under without waste of stock, and at the same time leaving no stitching exposed on the outside of the shoe, thereby obviating the several objections referred to.

The invention consists in fastening the stay by a blind stitch near the edges of the parts of the shoe-upper before said parts are sewed together.

Figure 1:
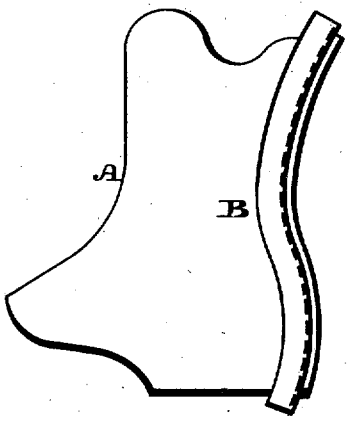
Figure 2:
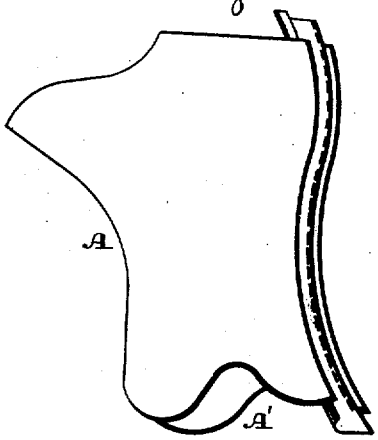

In Figure 1 the wrong side of a heel-stay, B, is shown, the outer edge of which is first stitched on the right side of the left quarter A. The other edge of the stay is then turned over, to allow of its being stitched in a similar manner on the right quarter A′, as shown in Fig. 2. In this figure the right quarter A′ is represented right side up, while the other quarter A and the stay B show the wrong side of the leather.

The distance between the seams connecting the stay with the right and left quarters and the edges of said quarters is determined by the width of the stay, and the manipulation of the work may be simplified by the employment of a guide, in order to secure an even distance from the edges of the quarters throughout the length of the seam.

Figure 3:
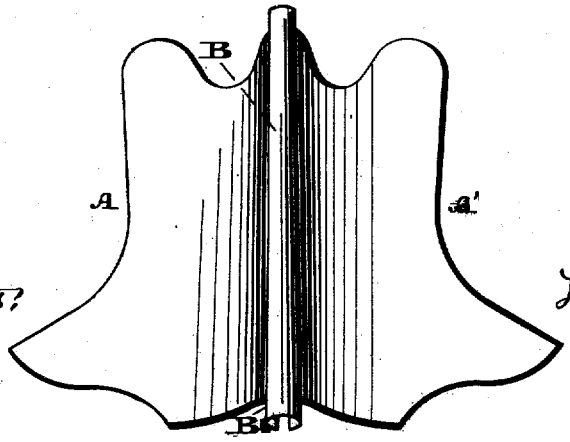

The seam completed is shown in Fig. 3.

Having thus described my invention, what I claim as new, and desire to secure by Letters Patent, is—

1. The above-described method of applying a stay-piece in boots or shoes the same consisting in stitching the stay on the parts to be united by a blind seam, substantially as and for the purpose set forth.

2. The improved article of manufacture consisting of a boot or shoe the seam or seams of which are protected by an outside stay or stays, the edges of which are turned under and sewed to the parts by a blind-stitch seam or seams, substantially as and for the purpose set forth.

LAURENS E. DE WARU.

Witnesses:
GEO. H. DIAMENT,
T. H. CHALLENGER.